6682X
C. Emmons,
Horse Power.
Patented Aug. 2, 1831.
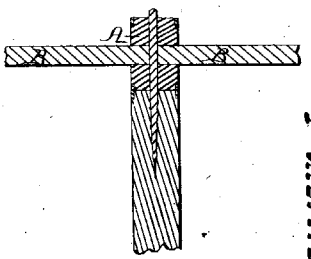
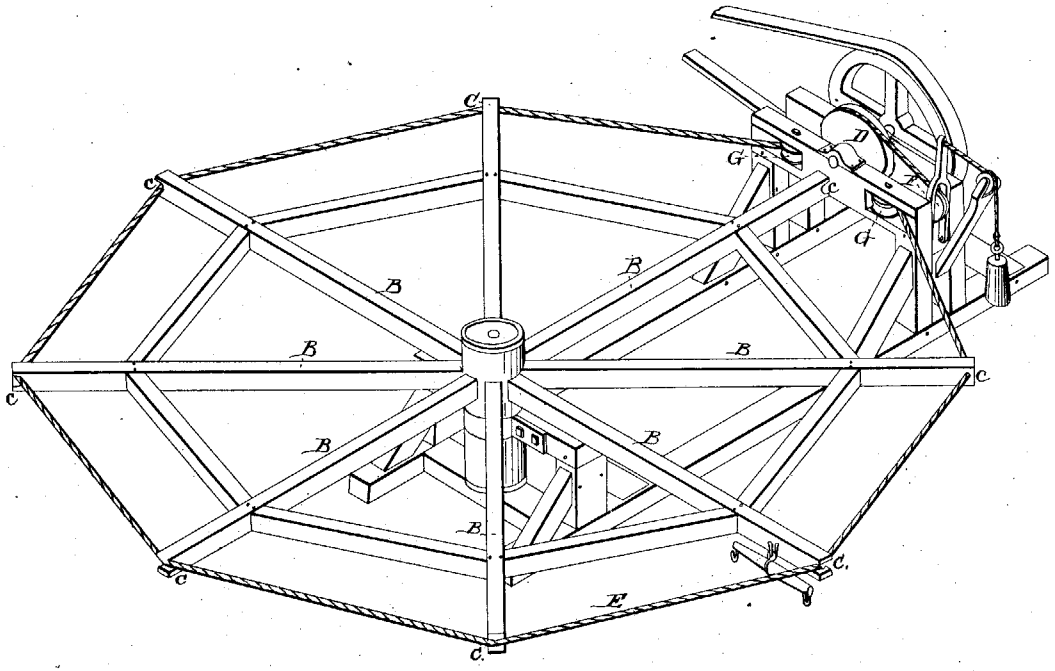
AM. PHOTO-LITHO. CO. N.Y. (OSBORNE'S PROCESS)

Aug 2 1881 Cd82X 367

Calvin Emmons of the City of New york &c

Date of Patent Aug 5. 1831

To All to whom these presents shall come: Be it Known that I Calvin Emmons of the City & County of New york, have invented a new and useful improvement in the mode of applying Horse power for propelling machinery and that the following is a full and exact description of the Construction and operation of said improvement in the Horse power as invented by me. A centre part or hub from one to two feet in diameter made of plank or of one solid piece of wood cut from off a log, & should be iron banded (or it may be made of cast iron) its axis perpendicular & kept in its position by a centre axle or pivot on which it turns, which communicates with a solid fixture below the hub. Mortices are made in this centre part or hub to receive the ends of the arms B.B.B.B.B.B.B.B which are usually from six to eight in number & from 10 to 15 feet in length; on one edge of the ends of which enters the hub is cut a dove tail that it may be fastened with a key which may be driven in and taken out at pleasure, or they may be fastened any other convenient way. A notch is cut horizontally in the outer ends of each of the arms nearly of an angle of about 45 degrees & as wide as [illegible] of the arms with [illegible] c.c.c.c.c.c.c wooden struts or braces between each of the arms
to keep them at equal distances apart (a chain or
rope may be substituted in their stead) braces
should be placed from the lower part of the
hub to the under side of the arms when the
arms are so long & heavy as to require being sup-
=ported D a whirl & cylender placed just with-
=out the circle which the outer ends of the arms
describe made from one solid log and pla-
=ced with its axis horizontal and supported
in its position by journals resting in a proper
fixture or frame, this whirl & cylinder may
be made separately of plank or boards &
placed on the same shaft at such distance
apart & made such size as may best suit
the purpose intended. E. A Rope the
ends of which are fastened to each other
by an iron hook & eye that it may be short
=ened or lengthened, as occasion may re=
=quire by unhooking & twisting or untwisting.
this rope is placed around in the notches in
the outer ends of the arms & passes once around
the whirl D (instead of this rope a chain may
be substituted) F. A movable whirl or pully
so placed that it may press outwardly against
the rope by means of a weight with which it
communicates by a rope passing over a pul-
ley or the rope may be made fast to a large
pulley or cylender & a weighted lever attach-
=ed (or a spring may be substituted) in order to keep
the rope equally tight should it stretch or shrink
G a friction or gage whirl placed in a pro-
per position to guide & cause the rope to run into the whirl D smoothly. when the above
described apparatus or horse power is to be
put in motion one or more horses are pla-
ced between & near the outer ends of the arms
just inside the rope & hitched to the arms
immediately behind them by means of which
they are made to walk in circular track
and causing the arms to revolve - the rope
being drawn tight by means of the movable
whirl F. & weight will be prevented from
slipping in the notches in the ends of the arms
& in the groove of the whirl D. consequently
a rotary motion will be communicated to
the said whirl & drum. the number of rev-
olutions of the whirl D. will be in proportion
as its diameter is with that of the circle des-
cribed by the ends of the revolving arms (deduc-
tion being made for the straight parts of the rope
between each of the arms) in many instances
the above mentioned whirl and drum D.
may be dispensed with by passing the rope E
around a whirl on the machine which is
to be put in motion & arranging the movable
whirl F. & weight in any convenient place
Also the whirl D. may be placed on a
shaft whose axis is perpendicular as in dri-
ving a Horse Corn Mill in which case the
whirl D may be placed on the mill stone
spindle. What I claim as new and
as my own invention or discovery in the above
described horse power or machine & for the
use of which I ask an exclusive privilege
is the construction & arrangement of the several parts above described & the application to the propelling of machinery by animal power.

Witnesses

David Chambers } Calvin Cummins

Timothy P. Bunyer }

(Patented 7th August 1837.) (Old 1000)